(12) United States Patent
Ekambaram et al.

(10) Patent No.: US 10,614,140 B2
(45) Date of Patent: Apr. 7, 2020

(54) KEYWORD BASED DATA CRAWLING

(71) Applicant: International Business Machines Corporation, Armonk, NY (US)

(72) Inventors: Vijay Ekambaram, Chennai (IN); Vikas Joshi, Bangalore (IN); Hima Prasad Karanam, Bangalore (IN); L. Venkata Subramaniam, Gurgaon (IN)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 851 days.

(21) Appl. No.: 15/170,419

(22) Filed: Jun. 1, 2016

(65) Prior Publication Data
US 2017/0351763 A1 Dec. 7, 2017

(51) Int. Cl.
*G06F 17/30* (2006.01)
*G06F 16/9535* (2019.01)
*G06F 16/248* (2019.01)
*G06F 16/2457* (2019.01)
*G06F 16/951* (2019.01)

(52) U.S. Cl.
CPC ........ *G06F 16/9535* (2019.01); *G06F 16/248* (2019.01); *G06F 16/24575* (2019.01); *G06F 16/24578* (2019.01); *G06F 16/951* (2019.01)

(58) Field of Classification Search
None
See application file for complete search history.

(56) References Cited

U.S. PATENT DOCUMENTS

| | | | |
|---|---|---|---|
| 5,428,778 A | 6/1995 | Brookes | |
| 7,634,475 B1 | 12/2009 | Hernek | |
| 7,676,521 B2 | 3/2010 | Wang et al. | |
| 7,765,320 B2 | 7/2010 | Vehse et al. | |
| 8,200,683 B2 | 6/2012 | Gupta et al. | |
| 8,812,541 B2 | 8/2014 | Ismalon | |
| 9,129,012 B2 | 9/2015 | LeBeau et al. | |
| 2006/0029184 A1* | 2/2006 | Lin | G01N 23/207 378/73 |
| 2007/0239703 A1 | 10/2007 | Wang et al. | |
| 2008/0208815 A1* | 8/2008 | Taylor | G06Q 30/02 |

(Continued)

OTHER PUBLICATIONS

Ying Liu, et al., "Using WordNet to Disambiguate Word Senses for Text Classification", ICCS 2007, Part III, LNCS 1489, 2007, 9 pages, Springer-Verlag Berlin Heidelberg.

(Continued)

*Primary Examiner* — Anhtai V Tran
(74) *Attorney, Agent, or Firm* — Ference & Associates LLC (57) ABSTRACT

One embodiment provides a method, including utilizing at least one processor to execute computer code that performs the steps of: receiving, from a user, one or more keywords, wherein the one or more keywords identify, within a social media data set, a subset of social media data; determining, based on social media statistical information, an estimated volume of the subset of the social media data; determining, based on the social media statistical information, an estimated relevance of the subset of social media data to the user; and updating the one or more keywords, to improve the estimated volume and estimated relevance. Other aspects are described and claimed.

20 Claims, 6 Drawing Sheets

(56) References Cited

U.S. PATENT DOCUMENTS

| | | | |
|---|---|---|---|
| 2008/0288347 A1 | 11/2008 | Sifry | |
| 2009/0112837 A1 | 4/2009 | Modani et al. | |
| 2009/0292677 A1* | 11/2009 | Kim | G06F 16/958 |
| 2009/0299978 A1 | 12/2009 | Fartumik et al. | |
| 2013/0138480 A1* | 5/2013 | Dong | G06Q 10/10 |
| | | | 705/7.36 |
| 2013/0238229 A1 | 9/2013 | Lundquist et al. | |
| 2014/0122464 A1* | 5/2014 | Arunachalam | G06F 16/9535 |
| | | | 707/723 |
| 2014/0214789 A1 | 7/2014 | Ozonat et al. | |
| 2014/0330646 A1 | 11/2014 | Mierle et al. | |
| 2015/0066664 A1 | 3/2015 | Hubbard et al. | |
| 2015/0134684 A1 | 5/2015 | Montana et al. | |
| 2015/0370805 A1 | 12/2015 | Jain et al. | |

OTHER PUBLICATIONS

Li, Xiaobin et al., "A WordNet-based Algorithm for Word Sense Disambiguation", IJCAI-95, Proceedings of the Fourteenth International Joint Conference on Artificial Intelligence, Aug. 20-25, 1995, Montreal, Quebec, Canada, 8 pages.

Tan, Yee Fan et al., "Hierarchical Cost-sensitive Web Resource Acquisition for Record Matching", 2010 IEEE/WIC/ACM International Conference on Web Intelligence and Intelligent Agent Technology Workshops, WI-IAT 2010 Workshops Proceedings, Aug. 31-Sep. 3, 2010, Toronto, Ontario, Canada, 9 pages, Accessed on Apr. 15, 2016.

* cited by examiner

KEYWORD BASED DATA CRAWLING

BACKGROUND

With the explosion of the Internet and social media, user generated content is being constantly created. Hundreds of millions of people post information online every day. This continuous posting has created an enormous knowledge base of information and opinions readily accessible to the public. The information obtained via market research and/or focus groups, which can cost thousands of dollars, can now be gathered via social media and online forums at a fraction of the cost. Individuals are regularly posting their opinions, advice, reviews, and knowledge online to share with the masses. However, managing and efficiently utilizing this enormous amount of information can be difficult and inefficient.

Particular industries and/or large corporations would benefit from proper analysis of this sea of information. However, it is unorganized and hard to sort. One method of information retrieval is through the use of keyword searches. Using keywords, interested parties can search through the unorganized information and locate information relevant to their interests. However, it can be difficult to identify the perfect keywords to search or base a search on. Moreover, choosing the wrong keywords can lead to returning too much information to analyze, returning too little information to analyze, or returning unrelated information.

BRIEF SUMMARY

In summary, one aspect of the invention provides a method comprising: utilizing at least one processor to execute computer code that performs the steps of: receiving, from a user, one or more keywords, wherein the one or more keywords identify, within a social media data set, a subset of social media data; determining, based on social media statistical information, an estimated volume of the subset of the social media data; determining, based on the social media statistical information, an estimated relevance of the subset of social media data to the user; and updating the one or more keywords, to improve the estimated volume and estimated relevance.

Another aspect of the invention provides an apparatus comprising: at least one processor; and a computer readable storage medium having computer readable program code embodied therewith and executable by the at least one processor, the computer readable program code comprising: computer readable program code that receives, from a user, one or more keywords, wherein the one or more keywords identify, within a social media data set, a subset of the social media data; computer readable program code that determines, based on social media statistical information, an estimated volume of the subset of social media data; computer readable program code that determines, based on the social media statistical information, an estimated relevance of the subset of social media data to the user; and computer readable program code that updates the one or more keywords, to improve the estimated volume and estimated relevance.

An additional aspect of the invention provides a computer program product comprising: a computer readable storage medium having computer readable program code embodied therewith, the computer readable program code comprising: computer readable program code that receives, from a user, one or more keywords, wherein the one or more keywords identify, within a social media data set, a subset of the social media data; computer readable program code that determines, based on social media statistical information, an estimated volume of the subset of social media data; computer readable program code that determines, based on the social media statistical information, an estimated relevance of the subset of social media data to the user; and computer readable program code that updates the one or more keywords, to improve the estimated volume and estimated relevance.

A further aspect of the invention provides a method comprising: obtaining, from a user, information for a social media keyword search comprising: one or more keywords, a cost parameter, and a relevance parameter; automatically generating one or more new keywords, based on the one or more keywords, to optimize the relevance parameter in view of the cost parameter; displaying, on a display device, a visual representation of the one or more new keywords, the visual representation comprising being based upon an updated cost parameter associated with the one or more new keywords and an updated relevance parameter associated with the one or more new keywords.

For a better understanding of exemplary embodiments of the invention, together with other and further features and advantages thereof, reference is made to the following description, taken in conjunction with the accompanying drawings, and the scope of the claimed embodiments of the invention will be pointed out in the appended claims.

DETAILED DESCRIPTION

It will be readily understood that the components of the embodiments of the invention, as generally described and illustrated in the figures herein, may be arranged and designed in a wide variety of different configurations in addition to the described exemplary embodiments. Thus, the following more detailed description of the embodiments of the invention, as represented in the figures, is not intended to limit the scope of the embodiments of the invention, as claimed, but is merely representative of exemplary embodiments of the invention.

Reference throughout this specification to "one embodiment" or "an embodiment" (or the like) means that a particular feature, structure, or characteristic described in connection with the embodiment is included in at least one embodiment of the invention. Thus, appearances of the phrases "in one embodiment" or "in an embodiment" or the like in various places throughout this specification are not necessarily all referring to the same embodiment.

Furthermore, the described features, structures, or characteristics may be combined in any suitable manner in at least one embodiment. In the following description, numerous specific details are provided to give a thorough understanding of embodiments of the invention. One skilled in the relevant art may well recognize, however, that embodiments of the invention can be practiced without at least one of the specific details thereof, or can be practiced with other methods, components, materials, et cetera. In other instances, well-known structures, materials, or operations are not shown or described in detail to avoid obscuring aspects of the invention.

The illustrated embodiments of the invention will be best understood by reference to the figures. The following description is intended only by way of example and simply illustrates certain selected exemplary embodiments of the invention as claimed herein. It should be noted that the flowchart and block diagrams in the figures illustrate the architecture, functionality, and operation of possible implementations of systems, apparatuses, methods and computer program products according to various embodiments of the invention. In this regard, each block in the flowchart or block diagrams may represent a module, segment, or portion of code, which comprises at least one executable instruction for implementing the specified logical function(s).

It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Specific reference will be made here below to FIGS. 1-5B. It should be appreciated that the processes, arrangements and products broadly illustrated therein can be carried out on, or in accordance with, essentially any suitable computer system or set of computer systems, which may, by way of an illustrative and non-restrictive example, include a system or server such as that indicated at 12' in FIG. 6. In accordance with an example embodiment, most if not all of the process steps, components and outputs discussed with respect to FIGS. 1-5B can be performed or utilized by way of a processing unit or units and system memory such as those indicated, respectively, at 16' and 28' in FIG. 6, whether on a server computer, a client computer, a node computer in a distributed network, or any combination thereof.

As discussed herein, although a large quantity of information may exist in the Internet, it can be difficult to navigate and organize. Generally, social media networks (e.g., TWITTER, FACEBOOK, etc.) allow third parties to purchase user content for the purposes of analyzation. TWITTER is a registered trademark of Twitter, Inc. in the United States of America and other countries. FACEBOOK is a registered trademark of Facebook, Inc. in the United States of America and other countries. The user information is typically purchased based on the volume of information requested or obtained by the purchasing party. For example, one hundred thousand (100,000) user posts may be considerably cheaper than one million (1,000,000) user posts.

Because of this volume based pricing strategy, purchasing parties want to ensure they are casting an appropriately sized net for their goals (e.g., not over or under purchasing). The method that is typically used for selecting data involves the use of a keywords and keyword search functions. For example, a user (e.g., business, individual, organization, etc.) has a topic on which he or she wants to gather data (e.g., an airbag recall), so he or she selects one or more appropriate keywords (e.g., "airbags") and retrieves any relevant posts regarding that keyword.

However, proper selection of a keyword can be extremely difficult. If a user chooses a common term (e.g., "airbag"), he or she is likely to retrieve a lot of information, most of which may not be relevant. Alternatively, if the search term is overly narrow (e.g., airbag recall in x brand motor vehicles) he or she may miss out on some desired information. This is because, as discussed herein, this information's price is based on the amount of information returned from the keyword search striking the right balance is critical.

Accordingly, an embodiment provides a method to optimize a keyword list to best match a cost and relevance constraint determined by a user. Thus, an embodiment may estimate the volume of information that can be generated from a given keyword list, as well as the volume of irrelevant information. A further embodiment may suggest alternate words to reduce redundancy or eliminate any irrelevant information. Thus, an embodiment provides a technical advantage over existing solutions by providing data cost optimization and evaluating the trade-off between the keywords and cost. Thus, given a set of keywords, an embodiment may determine an affordable cost and allowable tolerance on irrelevant information, and provide an estimate of the information volume (e.g., number of users posts) that will be crawled (e.g., analyzed) in a given time frame for every suggested keyword or keyword list. Moreover, an embodiment may provide an estimate of a percentage of relevant information in the overall sample based on the ambiguity of the words in the keyword list.

Figure 1:
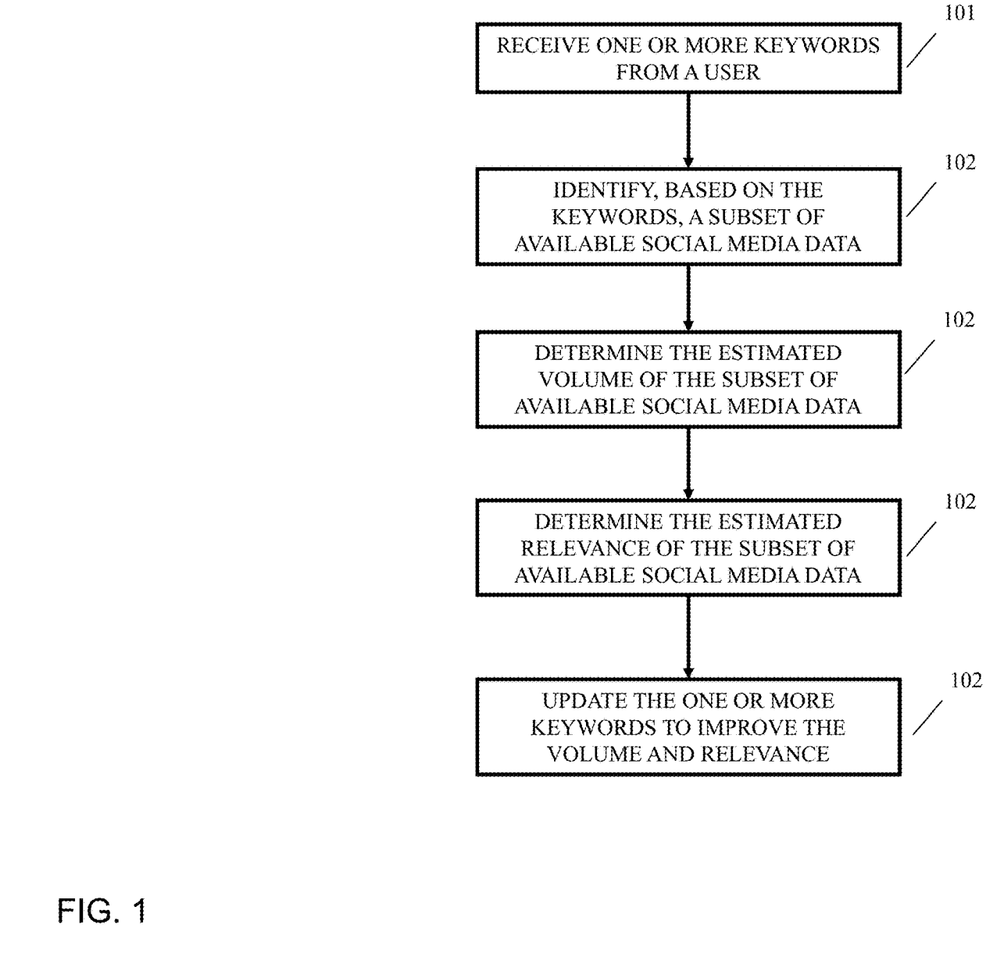
FIG. 1 illustrates an example method of improving keyword based data crawling.

Turning now to FIG. 1, an embodiment may receive one or more keywords from a user at 101. For example, a user may enter the terms "music," "award," and "show," into an embodiment in an attempt to gather information regarding a musical awards show. Based on the received keywords, an embodiment may identify a subset of available social media data at 102. Stated differently, an embodiment may, based on the received keywords, determine some amount of social media chatter regarding the topic of the keywords (e.g., how many people are taking about a musical award show). The amount of people currently involved in a discussion regarding the award show is only a subset, or portion, of all the online chatter currently taking place online.

Figure 2:
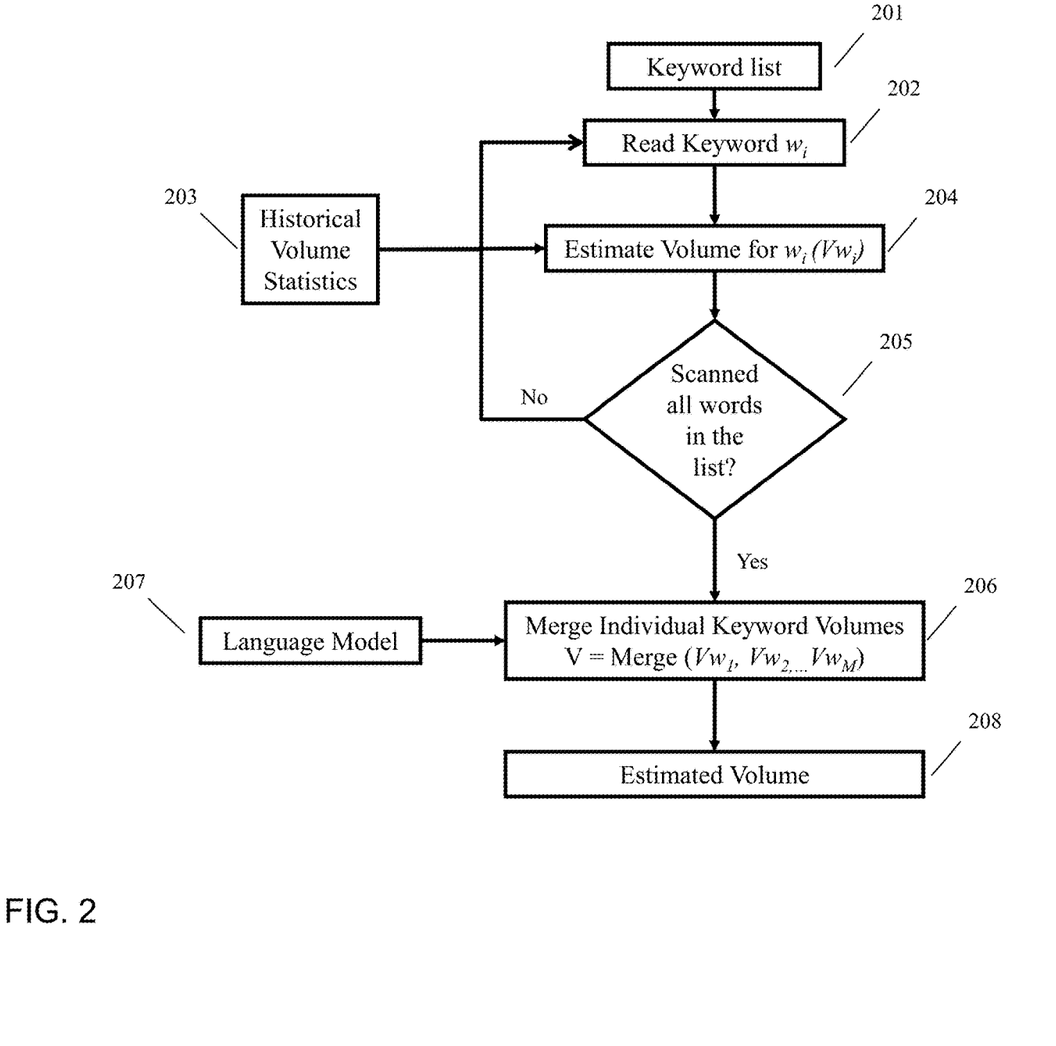
FIG. 2 illustrates an example method of estimating a volume of information returned based on a keyword list.

Based on the identified subset of social media data, an embodiment may determine an estimated volume of the subset data (e.g., the number of posts containing the keywords) at 102. As discussed herein, the volume is used to determine the price point for the information. Referring briefly to FIG. 2, once the keyword list is provided at 201, it is read by an embodiment at 202. An embodiment may then use historical volume statistics 203 to estimate the volume of the keyword at 204. By way of non-limiting example, the historical volume statistics at 203 may be collected over time (e.g., from previous social media analysis). Additionally, in one embodiment, a social media provider may offer certain statistical information to a user prior to the purchase. Thus, an embodiment can read and analyze a large corpus of social media posts (e.g., previously purchased or provided data) to establish a set of historical probability statistics.

Once an embodiment has estimated the volume for $w_i$ at 204, it may check to determine if there are additional keywords that need to be scanned at 205. If it is determined that more words in the keyword list need to be scanned, an embodiment may return to 202 and read the keyword(s). As with the previous example, an embodiment may then estimate the volume of the keyword at 204 using the historical volume data at 203, as discussed herein. Once the estimated volume for each word in the keyword list is calculated, an embodiment may then merge the individual keyword volumes at 206.

The merging of individual keywords at 206 may rely on a language model at 207 for additional information. The language model is preferably a probability distribution over a sequence of words. Based on a list of words (e.g., the keyword list) an embodiment may be able to estimate the likelihood of different phrases. This concept is used in many natural language processing applications.

In one embodiment, the language model may be estimated from a large corpus of social media information (e.g., a large corpus of tweets). The language model may enable an embodiment to estimate the probability of the co-occurrence of words within certain social media posts. The following equations may be used at 206 to estimate the volume of the merged keywords:

$$V = \sum_{i=1}^{M} V_{w_i} - \sum_{i=1}^{M} \sum_{j=1}^{M} V_{w_i w_j}$$

$$V_{w_i w_j} = P(w_i, w_j) \times (V_{w_i} + V_{w_j})$$

In a further embodiment, the estimation of each keyword may fluctuate with time. For example, the keyword earthquake will likely see a spike in social media immediately following a major earthquake. Thus, an embodiment may determine a statistical distribution of volume at various time intervals. Using the statistical distribution at various times (e.g., peak times, average times, etc.), an embodiment may be able to determine the average overall volume of tweets. In one embodiment, the average volume may be determined based on the calculated "mean value," and the peak volume may be determined based on "mean+n*standard-deviation." In an additional embodiment, the distributions may be conditioned on various parameters (e.g., location, time, seasons, etc.). Finally, an embodiment will determine the estimated volume at 208 based on the merging process of 206 discussed herein.

Figure 3:
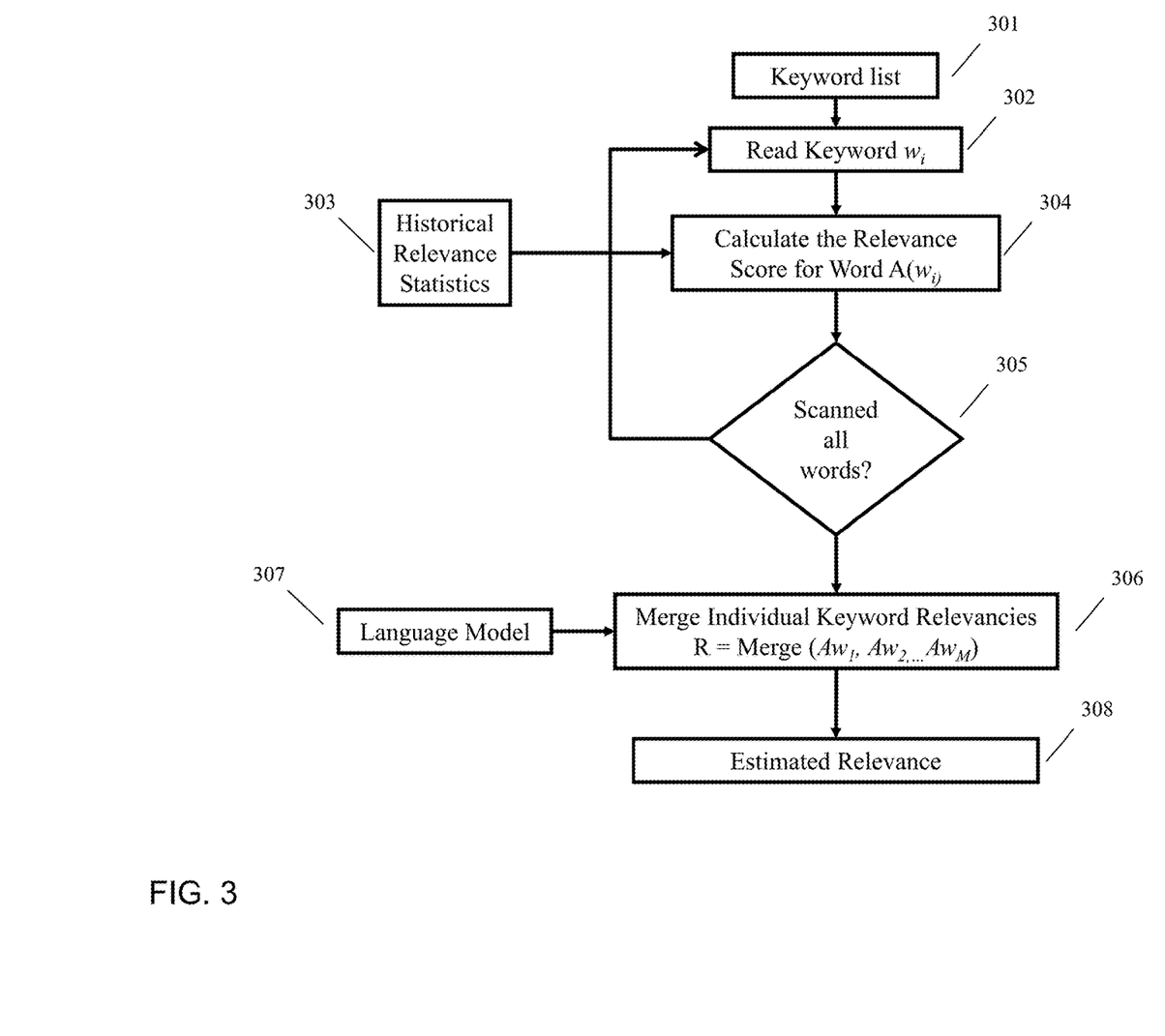
FIG. 3 illustrates an example method of estimating a relevance of information returned based on a keyword list.

Referring back to FIG. 1, an embodiment may further determine the estimated relevance of the subset of available social media data at 102. An illustrated example of an embodiment determining the estimated relevance of the subset of available social media data is shown in FIG. 3. Similar to determining the volume, a keyword list provided at 301 is read by an embodiment at 302. An embodiment may then use historical relevance statistics 303 to calculate the relevance score of a single keyword (e.g., the $A(w_i)$) at 304. By way of non-limiting example, the historical relevance statistics at 203 may be collected over time (e.g., from previous social media analysis). Additionally, in one embodiment, a social media provider may offer certain statistical information to a user prior to the purchase. Thus, an embodiment can read and analyze a large corpus of social media posts (e.g., previously purchased or provided data) to establish a set of historical probability statistics.

Once an embodiment has estimated the relevance for $w_i$ at 304, it may check to determine if there are additional keywords that need to be scanned at 305. If it is determined that more words in the keyword list need to be scanned, an embodiment may return to 302 and read the keyword. As with the previous example, an embodiment may then estimate the relevance of the keyword at 304 using the historical relevance data at 303, as discussed herein. Once the estimated relevance for each word in the keyword list is calculated, an embodiment may then merge the individual keyword relevancies (e.g., Merge ($Aw_1$, $Aw_2$, . . . $Aw_M$) at 306.

The merging of individual keywords at 306 may rely on a language model at 307 for additional information. The language model is preferably a probability distribution over a sequence of words. Based on a list of words (e.g., the keyword list) an embodiment may be able to estimate the likelihood of different phrases. Finally, the estimated relevance of the merger of all the words contained in the keyword list is generated at 308.

This concept is used in many natural language processing applications. In one embodiment, the language model may be estimated from a large corpus of social media information (e.g., a large corpus of tweets). The language model may enable an embodiment to estimate the probability of the co-occurrence of words within certain social media posts.

In an embodiment, a word or string of words may have several meanings. For example, the term "current" may be directed toward electrical current, ocean current, or something happening, being used, or being done at the present time. Word relevance can be difficult to identify, thus, the language model (e.g., a natural language processing) may struggle to identify a term in isolation without context. One embodiment may use a large lexical database (e.g., WordNet) to disambiguate between term meanings. Additionally, an embodiment may use the additional words in the keyword list at 301 and/or the historical relevance statistics at 303 to better infer context and increase the capability of language model.

Figure 4:
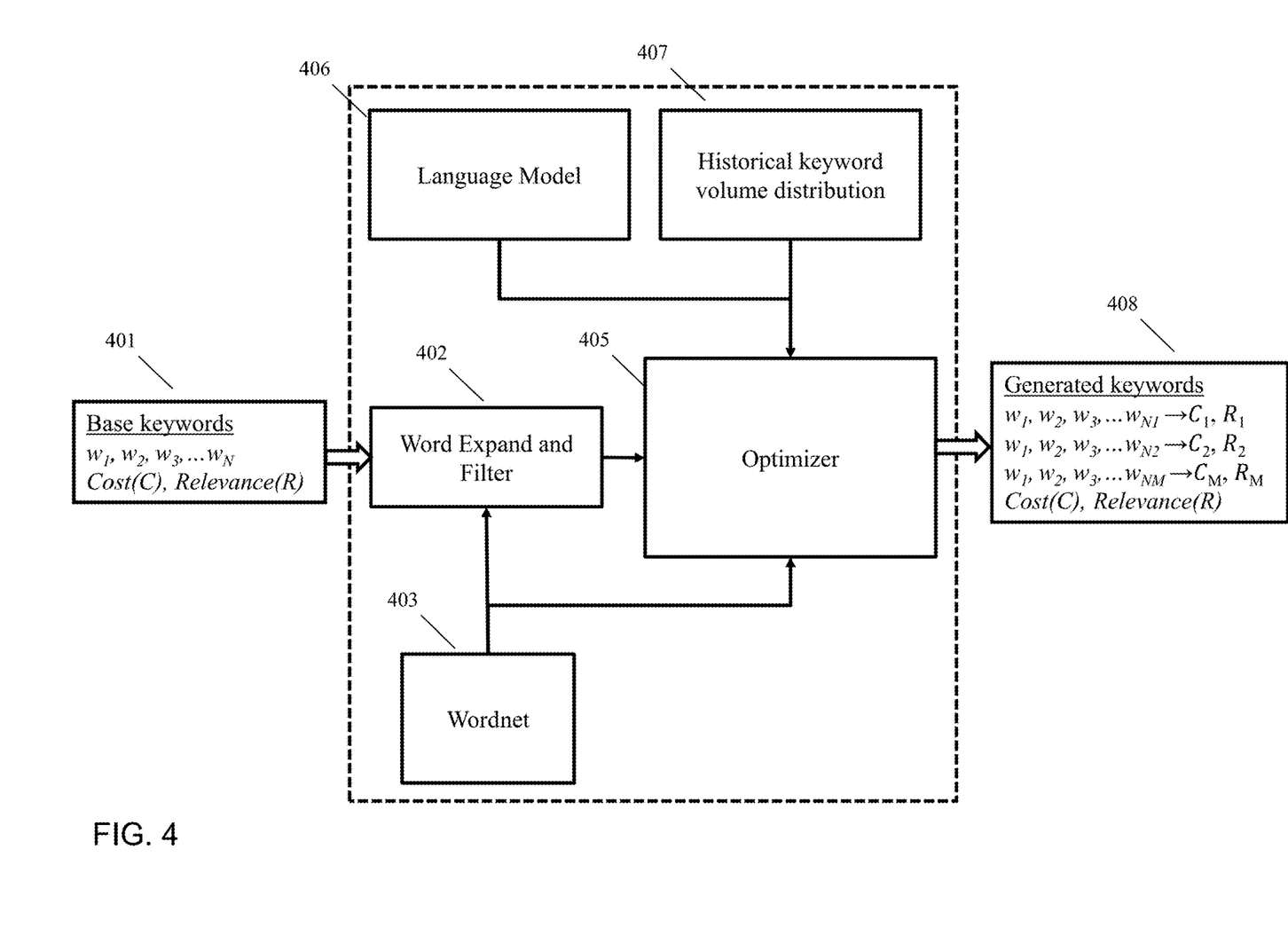
FIG. 4 illustrates an example embodiment of a system for improving keyword based data crawling.

Referring to FIG. 4, an additional illustrated example of improving keyword based data crawling is shown. In an embodiment, a set of base keywords is received at 401. The keywords are then expanded and filtered at 402 using information contained within a natural language processor (e.g., WordNet) at 403. The expanded and filtered keywords 402 are then given to the optimizer at 405. The optimizer utilizes information from the language model 406 and the historical keyword volume distribution at 407 to generate a new set of key words at 408. In one embodiment, the generated keywords 408 may contain a cost and relevance factor $[C_1, R_2]$ to better guide a user in the selection process.

Figure 5A:
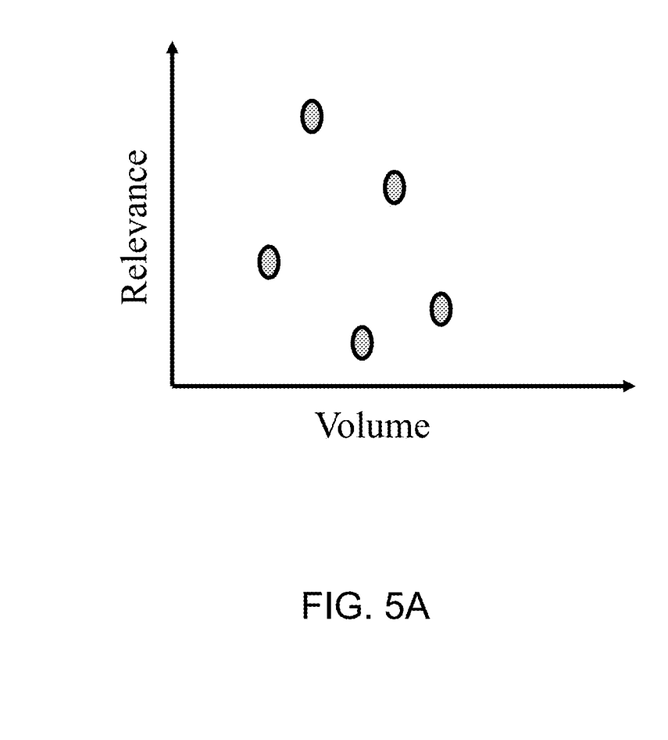
FIG. 5A illustrates an example of a 2-D visual representation of a keyword list.

However, because an embodiment may provide a user with a large number of keyword alternatives it can be difficult to identify the best fit. Thus, an embodiment may generate an interactive visualization of the generated keyword lists based on one or more of Cost, Relevance, and Volume of the returned information. By way of non-limiting example, FIG. 5A illustrates a 2-D graphical representation of the Relevance and Volume of five different generated keyword lists. Thus, an embodiment may give a user a visual representation to enable a user to better see how volume and relevance of returned information is related for each set of keywords.

Figure 5B:
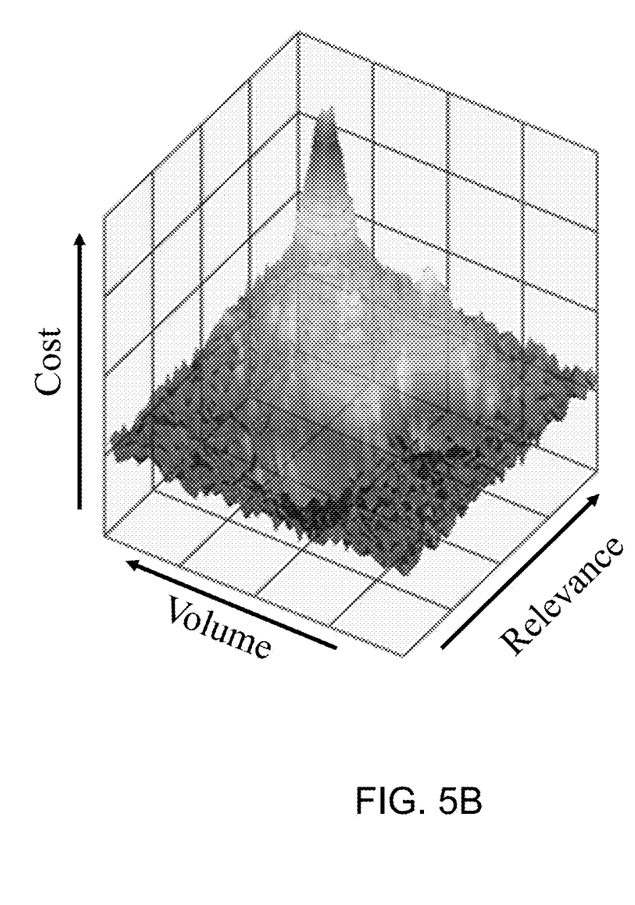
FIG. 5B illustrates an example of a 3-D visual representation of a keyword list.

In an additional embodiment, a 3-D graphical representation may be generated based on the Cost, Volume, and Relevance of the returned information, such as that shown in FIG. 5B. By including the cost parameter, a user may be better able to determine the most effective use of their investment. For example, the highest volume and relevance also corresponds to the highest peak (e.g., highest cost).

Accordingly, an embodiment provides a system to optimize a crawl of a keyword-set designed to extract social media messages, wherein the optimization satisfies a budget and relevance constraint. One embodiment may determine one or more alternate keyword-sets matching the data-cost and relevance constraints given by a user. In order to perform this task, an embodiment receives a set of keywords, a data cost and data relevance. These factors can be obtained in a variety of ways. For example, they may be entered directly by a user, derived based on previous user preferences, or determined based on a need identification process (e.g., a series of questions directed toward the user to identify their needs). An embodiment then utilizes an optimizer module to generate one or more alternate keyword sets (e.g., using synonyms).

Once the keyword sets are generated, an embodiment estimates the number of messages crawled in a given time frame (e.g., the estimated data-cost) and estimates the relevance of the crawled messages for the given crawl word set frame (e.g., estimated data-relevance). An embodiment then correlates the estimated data cost and data relevance of the one or more generated keyword sets with the input data cost and data relevance constraints.

Additionally, an embodiment may personalize one or more keyword set recommendations based on the user's analysis requirement and allowable computational complexity. By way of example, an embodiment may provide various choices for the alternate keyword sets. A user may then select his or her preferred match based on this requirement and allowed tradeoff. To enable this, an embodiment may display the alternate keyword sets through various visualization embodiments, as discussed herein, which may help a user choose the most appropriate keyword set based on allowed trade-offs.

In a further embodiment, if a user provides details on the kind of analysis (e.g., what the user intends to do with the retrieved data) and the allowable computational complexity, and suggested hotspots may be recommended within the visualization graphs as recommendations to the user using visual indicators. For example, for all the generated keyword set alternatives, an embodiment may estimate the required computational complexity based on the type of analysis. Then, by correlating the estimated computational complexity with the allowed computational complexity, an embodiment may suggest various hot-spots that are smarter recommendations of keyword set alternatives personalized to the user. An embodiment may also estimate and suggest methods for improvement in accuracy which the user gets when the computational complexities are increased. This would help a user manage his or her computational resources in the future.

Figure 6:
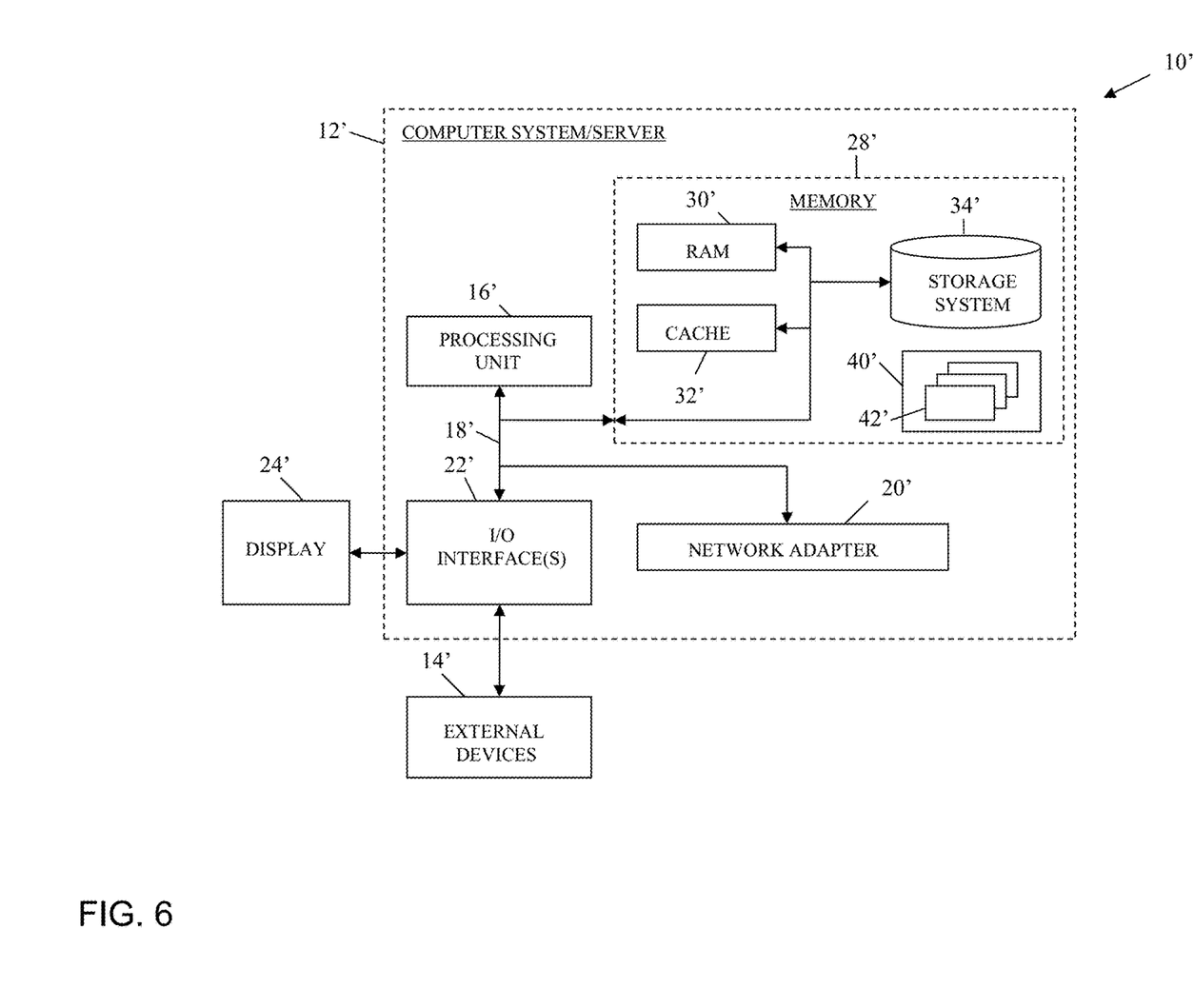
FIG. 6 illustrates a computer system.

As shown in FIG. 3, computer system/server 12' in computing node 10' is shown in the form of a general-purpose computing device. The components of computer system/server 12' may include, but are not limited to, at least one processor or processing unit 16', a system memory 28', and a bus 18' that couples various system components including system memory 28' to processor 16'. Bus 18' represents at least one of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12' typically includes a variety of computer system readable media. Such media may be any available media that are accessible by computer system/server 12', and include both volatile and non-volatile media, removable and non-removable media.

System memory 28' can include computer system readable media in the form of volatile memory, such as random access memory (RAM) 30' and/or cache memory 32'. Computer system/server 12' may further include other removable/non-removable, volatile/non-volatile computer system storage media. By way of example only, storage system 34' can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18' by at least one data media interface. As will be further depicted and described below, memory 28' may include at least one program product having a set (e.g., at least one) of program modules that are configured to carry out the functions of embodiments of the invention.

Program/utility 40', having a set (at least one) of program modules 42', may be stored in memory 28' (by way of example, and not limitation), as well as an operating system, at least one application program, other program modules, and program data. Each of the operating systems, at least one application program, other program modules, and program data or some combination thereof, may include an implementation of a networking environment. Program modules 42' generally carry out the functions and/or methodologies of embodiments of the invention as described herein.

Computer system/server 12' may also communicate with at least one external device 14' such as a keyboard, a pointing device, a display 24', etc.; at least one device that enables a user to interact with computer system/server 12'; and/or any devices (e.g., network card, modem, etc.) that enable computer system/server 12' to communicate with at least one other computing device. Such communication can occur via I/O interfaces 22'. Still yet, computer system/server 12' can communicate with at least one network such as a local area network (LAN), a general wide area network (WAN), and/or a public network (e.g., the Internet) via network adapter 20'. As depicted, network adapter 20' communicates with the other components of computer system/server 12' via bus 18'. It should be understood that although not shown, other hardware and/or software components could be used in conjunction with computer system/server 12'. Examples include, but are not limited to: microcode, device drivers, redundant processing units, external disk drive arrays, RAID systems, tape drives, and data archival storage systems, etc.

This disclosure has been presented for purposes of illustration and description but is not intended to be exhaustive or limiting. Many modifications and variations will be apparent to those of ordinary skill in the art. The embodiments were chosen and described in order to explain principles and practical application, and to enable others of ordinary skill in the art to understand the disclosure.

Although illustrative embodiments of the invention have been described herein with reference to the accompanying drawings, it is to be understood that the embodiments of the invention are not limited to those precise embodiments, and that various other changes and modifications may be affected therein by one skilled in the art without departing from the scope or spirit of the disclosure.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:
1. A method comprising:
utilizing at least one processor to execute computer code that performs the steps of:

receiving, from a user, one or more keywords, wherein the one or more keywords comprise keywords to be provided to a social media entity for purchasing of information related to the one or more keywords from the social media entity;

identifying, within a social media data set, a subset of social media data corresponding to the one or more keywords;

determining, based on social media statistical information, an estimated volume of the subset of the social media data, wherein the estimated volume comprises an estimate of a volume of information that would be returned from the social media entity corresponding to the one or more keywords, wherein the estimated volume is estimated based upon the subset of social media data, wherein the determining comprises merging estimated volume amounts for each of the one or more keywords, wherein the determining comprises estimating an estimated volume for merged keywords utilizing a language model to estimate a probability of co-occurrence of keywords within the social media data set, wherein the estimated volume comprises a statistical distribution based upon time intervals;

determining, based on the social media statistical information, an estimated relevance of the subset of social media data to the user, wherein the estimated relevance comprises an identification of a relevance of the information that would be returned from the social media entity using the one or more keywords, wherein the estimated relevance is estimated based upon the subset of social media data; and updating the one or more keywords, to improve the estimated volume and estimated relevance, wherein the updated one or more keywords is provided to the social media entity.

2. The method of claim 1, wherein the statistical information comprises at least one of: historical statistics and a language model.

3. The method of claim 1, further comprising receiving, from a user, at least one volume parameter and at least one relevance parameter, wherein said updating is based on the at least one volume parameter and the at least one relevance parameter.

4. The method of claim 1, further comprising, generating a visual representation of the updated one or more keywords; and displaying, on a display device the visual representation.

5. The method of claim 4, wherein the visual representation is generated based on at least one of: an estimated relevance of the updated one or more keywords, an estimated volume of the updated one or more keywords, and an estimated cost of the updated one or more keywords.

6. The method of claim 4, wherein the visual representation is at least one of: a two dimensional graph and a three dimensional graph.

7. The method of claim 1, further comprising:
receiving, from a user, a desired analysis type; and
wherein the updating the one or more keywords is based on the analysis type.

8. The method of claim 7, wherein the analysis type comprises computational power available to a user.

9. The method of claim 1, further comprising analyzing, based on a user request, a new subset of social media data, wherein the new social media data are based on the one or more updated keywords.

10. An apparatus comprising:
at least one processor; and
a computer readable storage medium having computer readable program code embodied therewith and executable by the at least one processor, the computer readable program code comprising:

computer readable program code that receives, from a user, one or more keywords, wherein the one or more keywords comprise keywords to be provided to a social media entity for purchasing of information related to the one or more keywords from the social media entity;

computer readable program code that identifies, within a social media data set, a subset of the social media data corresponding to the one or more keywords;

computer readable program code that determines, based on social media statistical information, an estimated volume of the subset of social media data, wherein the estimated volume comprises an estimate of a volume of information that would be returned from the social media entity corresponding to the one or more keywords, wherein the estimated volume is estimated based upon the subset of social media data, wherein the determining comprises merging estimated volume amounts for each of the one or more keywords, wherein the determining comprises estimating an estimated volume for merged keywords utilizing a language model to estimate a probability of co-occurrence of keywords within the social media data set, wherein the estimated volume comprises a statistical distribution based upon time intervals;

computer readable program code that determines, based on the social media statistical information, an estimated relevance of the subset of social media data to the user, wherein the estimated relevance comprises an identification of a relevance of the information that would be returned from the social media entity using the one or more keywords, wherein the estimated relevance is estimated based upon the subset of social media data; and computer readable program code that updates the one or more keywords, to improve the estimated volume and estimated relevance, wherein the updated one or more keywords is provided to the social media entity.

11. A computer program product comprising:
a computer readable storage medium having computer readable program code embodied therewith, the computer readable program code comprising:

computer readable program code that receives, from a user, one or more keywords, wherein the one or more keywords comprise keywords to be provided to a social media entity for purchasing of information related to the one or more keywords from the social media entity;

computer readable program code that identifies, within a social media data set, a subset of the social media data corresponding to the one or more keywords;

computer readable program code that determines, based on social media statistical information, an estimated volume of the subset of social media data, wherein the estimated volume comprises an estimate of a volume of information that would be returned from the social media entity corresponding to the one or more keywords, wherein the estimated volume is estimated based upon the subset of social media data, wherein the determining comprises merging estimated volume amounts for each of the one or more keywords, wherein the determining comprises estimating an estimated volume for merged keywords utilizing a language model to estimate a probability of co-occurrence of keywords within the social media data set, wherein the estimated volume comprises a statistical distribution based upon time intervals;

computer readable program code that determines, based on the social media statistical information, an estimated relevance of the subset of social media data to the user, wherein the estimated relevance comprises an identification of a relevance of the information that would be returned from the social media entity using the one or more keywords, wherein the estimated relevance is estimated based upon the subset of social media data; and computer readable program code that updates the one or more keywords, to improve the estimated volume and estimated relevance, wherein the updated one or more keywords is provided to the social media entity.

12. The computer program product of claim 11, wherein the statistical information comprises at least one of: historical statistics and a language model.

13. The computer program product of claim 11, further comprising receiving, from a user, at least one volume parameter and at least one relevance parameter, wherein said updating is based on the at least one volume parameter and the at least one relevance parameter.

14. The computer program product of claim 11, further comprising, generating a visual representation of the updated one or more keywords; and
displaying, on a display device the visual representation.

15. The computer program product of claim 14, wherein the visual representation is generated using at least one of: an estimated relevance of the updated one or more keywords, an estimated volume of the updated one or more keywords, and an estimated cost of the updated one or more keywords.

16. The computer program product of claim 14, wherein the visual representation is at least one of: a two dimensional graph and a three dimensional graph.

17. The computer program product of claim 11, further comprising:
receiving, from a user, a desired analysis type; and
wherein the updating the one or more keywords is based on the analysis type.

18. The computer program product of claim 17, wherein the analysis type comprises computational power available to a user.

19. The computer program product of claim 11, further comprising analyzing, based on a user request, a new subset of social media data, wherein the new social media data are based on the one or more updated keywords.

20. A method comprising:
obtaining, from a user, information for a social media keyword search comprising: one or more keywords, a cost parameter, and a relevance parameter, wherein the one or more keywords comprise keywords to be provided to a social media entity for purchasing of information related to the one or more keywords from the social media entity;
automatically generating one or more new keywords, based on the one or more keywords, to optimize the relevance parameter in view of the cost parameter, wherein the automatically generating comprises:
identifying a subset of social media data corresponding to the one or more keywords;
determining an estimate of a volume of information that would be returned from the social media entity corresponding to the one or more keywords, wherein the estimated volume is estimated based upon the subset of social media data, wherein the determining comprises merging estimated volume amounts for each of the one or more keywords, wherein the determining comprises estimating an estimated volume for merged keywords utilizing a language model to estimate a probability of co-occurrence of keywords within the social media data set, wherein the estimated volume comprises a statistical distribution based upon time intervals; and
determining an identification of a relevance of the information that would be returned from the social media entity using the one or more keywords, wherein the estimated relevance is estimated based upon the subset of social media data; and
displaying, on a display device, a visual representation of the one or more new keywords, the visual representation comprising being based upon an updated cost parameter associated with the one or more new keywords and an updated relevance parameter associated with the one or more new keywords.

\* \* \* \* \*